Figure 1:
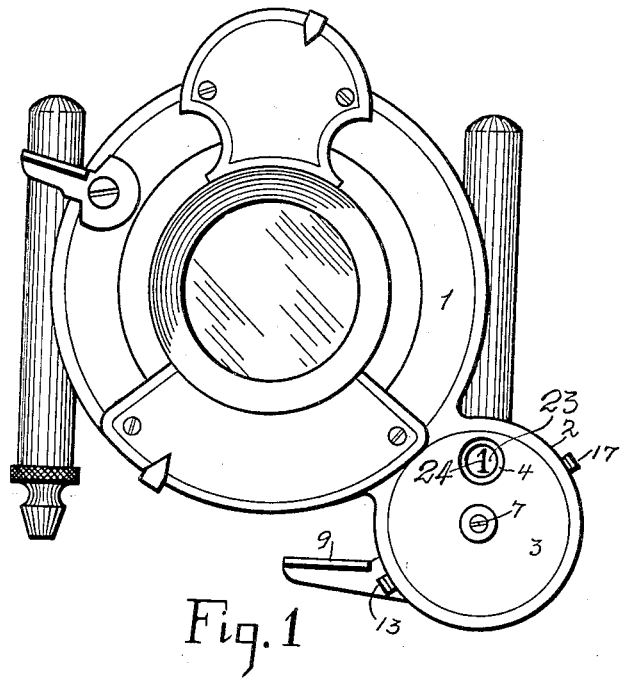

L. P. CARHART.
SHUTTER FOR PHOTOGRAPHING DEVICES.
APPLICATION FILED APR. 5, 1916.

1,232,768.

Patented July 10, 1917.
2 SHEETS—SHEET 1.

INVENTOR
Linden P. Carhart
BY
Arthur Phelps Marr
ATTORNEY

L. P. CARHART.
SHUTTER FOR PHOTOGRAPHING DEVICES.
APPLICATION FILED APR. 5, 1916.

1,232,768.

Patented July 10, 1917.
2 SHEETS—SHEET 2.

INVENTOR
Landen P. Carhart
BY
Arthur Phelps Marr
ATTORNEY

UNITED STATES PATENT OFFICE.

LINDEN PETER CARHART, OF BROOKLYN, NEW YORK.

SHUTTER FOR PHOTOGRAPHING DEVICES.

1,232,768.      Specification of Letters Patent.      Patented July 10, 1917.

Application filed April 5, 1916. Serial No. 89,016.

*To all whom it may concern:*

Be it known that I, LINDEN PETER CARHART, a citizen of the United States, and resident of the borough of Brooklyn, county of Kings, city and State of New York, have invented certain new and useful Improvements in Shutters for Photographing Devices, of which the following is a specification.

In this invention I have endeavored to develop a means whereby I may control the operation of the shutter of the camera or other photographic device and in such a manner as to make it possible to operate the shutter only when a proper film or plate is in position to be exposed.

In the past and in ordinary cameras it is quite possible and it very often occurs that a double exposure will be made upon a single sensitized surface and this accident quite often occurs when films are used and it is due to the fact that the operator neglects to turn the film or roll it or move it in such a manner as to place an unexposed surface in position after each picture has been taken.

My device although operating mechanically independently of the film or film roll or spool is so constructed that its operation is in virtual combination with the film or spool for the reason that after an exposure has been made means are provided for indicating just what film has been exposed and if operated according to very simple instructions and rules, the films will be exposed consecutively and the shutter will be automatically locked after each exposure and in such a manner as to indicate the particular film which was exposed prior to the locking of the shutter.

Although accomplishing important functions my device is of simple construction and the operation and the advantages to be derived therefrom will be fully set forth as the specification progresses.

The following is what I consider a good means of carrying out this invention and the accompanying drawings should be considered when reviewing the specification, which follows:

In the drawings:

Figure 1 is a front elevation of a photographic shutter with my device attached.

Figure 2:
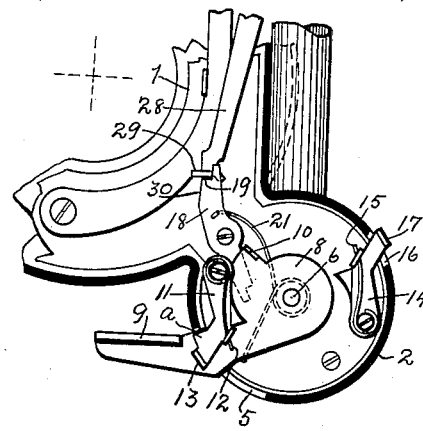

Fig. 2. is an elevation of a part of the interior mechanism.

Figure 3:
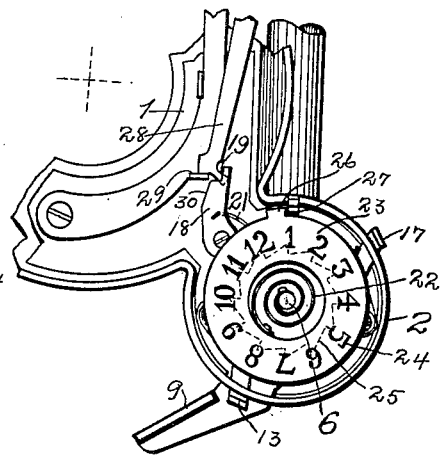

Fig. 3. shows portions of the interior mechanism with the dial in position.

Figures 4, 5:
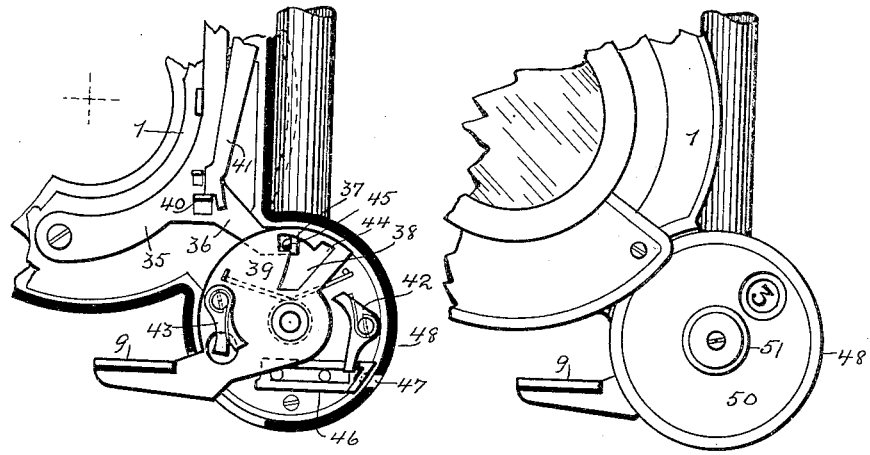

Fig. 4. is an elevation of a different construction.

Fig. 5. an elevation of a modification of the device shown in Fig. 1.

Figures 6, 7:
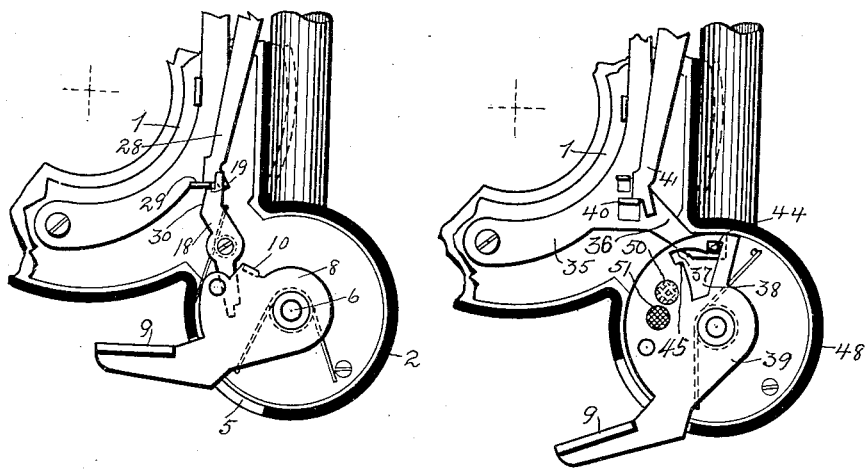

Fig. 6. an elevation of a part shown in Fig. 2.

Fig. 7. an elevation of a part shown in Fig. 4, and in a different position during the operation.

Similar reference numerals indicate like parts in all of the figures where they appear.

As my device is adapted to be attached or to be a part of an ordinary photographic shutter, I will indicate the entire shutter at 1, using different reference characters to indicate other parts of the shutter that may be concerned in the following description.

Attached to or formed integral with the casing of the shutter 1, is a second casing 2, which may be in the shape of a circular or cylindrical dished or cup shaped member. The diameter of this casing 2, will be less than the diameter of the shutter to which it is attached and the back plate or the means by which the back of the casing 2, is closed may be formed integral with the casing.

In the open front of the casing 2, I arrange a disk 3, having an aperture 4, and in one side of the casing 2, I provide an opening or slot 5.

A central stud 6, extending and secured in the casing 2, may be screw-threaded to receive the screw 7, by means of which the disk or front plate 3, is secured in position. Upon this stud 6, and partially rotatable thereon, is a member 8, which I will refer to as a trigger. This member extends through the slot 5, and at its outer end is provided with a finger rest or operating step 9.

The trigger 8, has a projection 10, which extends toward the back plate of the casing 2, and the trigger also carries an independently movable dog 11, which is urged inward by a spring 12. The free end of the dog 11, extends exterior to the casing 2, through the slot 5, and I provide a means such as an upturned portion 13, which will allow the dog 11, to be withdrawn against the tension of its spring 12.

Pivoted within the casing 2, and about opposite the dog 11, is a second dog 14 which is urged toward the axial center of the casing 2, by means of a spring 15. The end of the dog 14, extends exterior to the casing 2, passing through a small slot 16, and an up-turned portion 17, of the dog 14, will allow this dog to be withdrawn.

Pivoted at a convenient point in the casing 2, of the shutter casing 1, is a lever 18. This lever is centrally pivoted and extends in a nearly vertical line and at the upper and lower ends respectively of the lever 18, I arrange steps as shown at 19 and 20. A spring 21, retained by the stud 6, tends to retain the trigger 8, in an upward position and also tends to rotate the upper end of the lever 18 into the shutter.

Upon the stud 6, I arrange a spiral spring 22, which spring supports and tends to revolve a disk 23. The disk 23 has a series of numerals 24, upon its front face and upon the back face of the disk is a ratchet wheel 25, which is adapted to be engaged and operated by the ratchets or pawls 11 and 14.

The disk 23 is also provided with a stop or projection 26, which is adapted to be impinged upon a projection 27, from the casing 2, and when the disk is released by the withdrawal of the dogs 11 and 14, the spring 22 will revolve the disk 23 until the projection 26 is engaged by the stop 27.

From the shutter operating mechanism a vertical bar 28, extends downward to a point adjacent to the upper end of the centrally pivoted lever 18, and this bar 28 is provided with a step or projection 29, which is adapted to engage in the stop or recess 19 of the lever 18.

In the operation of my device the parts are assembled as indicated at Fig. 2, and the spring 21, has raised the trigger 8, and has forced inward the upper end of the lever 18. In this position the shutter of the camera is locked and it cannot be operated. Before an operation of the shutter can be accomplished it will be necessary to depress the trigger 8 to the position shown in Fig. 3. This will ratchet the disk 23 one notch and will expose a new number through the aperture 4 in the plate 3, at the same time the lever 18 will be locked to the position shown in Fig. 3, and the vertical bar 28 will be disengaged from the lever. The projection 10 of the trigger 8, will be engaged in the step 20, of the lever 18 and the trigger 8, will be retained in a downward position. The operation of the shutter will cause the vertical bar 28 to move downward upon the inclined face 30 of the lever 18. This will release the step 20, from the projection 10, and will allow the trigger to return to its uppermost position as shown in Fig. 2. Now when the shutter is released and the bar 28, returned upward it will again engage with the upper end of the lever 18 and no further operation of the shutter may be had until the trigger 8, is again depressed, which depression of the trigger will ratchet into position a new number of the dial 23, and as these numbers correspond with the numbers on the film it is obvious that if both the film and the dial show the same number and the shutter is in a locked position, then the film in position for exposure has been exposed and a new film should be turned into position, and trigger depressed to show corresponding number.

It is my intention that the numbers on the film and dial should always harmonize and to that end I have provided means for releasing the disk 23, allowing it to return to expose the lowest number. When a new film is inserted, the releasing means is the means which allows the dogs 11 and 14, to be withdrawn in the manner described, but it will be understood that to release the disk it is necessary to move both of the dogs outward. The movement of the dog 14, alone would be without effect, but the dog 11, which is in constant contact with the ratchet wheel should not be moved outward unless it is desired to reverse the movement of the disk 23.

In developing this invention, I have discovered that other means may be employed for obtaining the functional features desired such means is shown in Figs. 4, 5, and 7.

In this construction a shutter operating bar 35 is provided with an extension 36, having a projection 37, which is introduced in an aperture 38 of a trigger 39. A projection 40 is formed in the shutter bar 35, and the vertical bar 41 may be in constant contact with the projection 40. Two dogs 42 and 43 are also provided and which operate a numeral bearing disk in the manner previously described.

It will be noted that the aperture 38 in the trigger 39 is of a peculiar shape. In the position shown in Fig. 7 the trigger is depressed and the projection 37, is caused to enter the extension 44, of the aperture 38. An operation of the shutter will depress the projection 37, out of the aperture 44 and will allow a return of the trigger, the complete operation of the shutter bringing the projection 37 into the position shown in Fig. 4. In this position the shutter cannot be operated as a downward pressure upon the vertical bar 41, will cause the projection 37 to engage upon the shoulder 45, of the aperture 38. It will then be necessary to operate the trigger to position the parts so that the shutter may be again operated. It will be understood that the principle of my device resides in the following facts.

The disk 23, is numbered to correspond with the film. It will be necessary to operate the disk prior to each operation of the shutter as the shutter will become locked after each operation and may be only released by an operation of the trigger which causes a partial revolution of the disk.

To release the dogs 42 and 43, I provide a slidable member 46, which may be moved inward by the point of a lead pencil or other suitable instrument, being inserted through a perforation 47, in the casing 48. As the dog 43 is normally out of engagement with the movable member 46, the disk can only be released when the trigger 39 is depressed.

It is possible to omit the means for releasing the disk 23. to do this I would allow the perforated face plate 50 shown in Fig. 5, to be revolved. This face plate may be frictionally retained in position by means of a spring washer 51, and it may be revolved to expose the lowest number on the disk when a new film is inserted in the camera.

In Fig. 2, and at A I have indicated a projection or stop formed upon the dog 11, which will effectively prevent the operation of this dog and the release of the disk 23, when the shutter is locked or when the trigger 8, is in the elevated position. This is important for obvious reasons although it may be dispensed with with a corresponding loss of function.

In Fig. 7, I have shown two colored spots or targets 52 and 53 upon the trigger 39. I have found that the disk number 23 may be dispensed with by the use of these targets, the targets indicating through a conveniently arranged perforation. When the target 52, which I prefer should be a yellow target, is exposed, the trigger shutter and film may be presumed to be in position for operation. When the lower target 53, which I prefer should be black is exposed through the aperture or perforation, the shutter is locked and this should indicate that the film should be turned before the shutter is released.

Parts of my device may be used without the whole and parts of one construction may be used with parts of another construction and other modifications may be made within the scope of the appended claims without departing from the principle or sacrificing the advantages of the invention.

Having carefully and fully described my invention what I claim is:

1. A combination with a shutter of a lever for locking said shutter against operation, a trigger adapted to operate said lever to release said shutter and means upon said lever for locking said trigger in position to be released by the operation of said shutter and means operated by said trigger for registering the operation of said trigger.

2. The combination with a photographic shutter and the casing thereof, of a cylindrical extension from said casing, a lever centrally pivoted in said casing and a second lever operated by said first mentioned lever and adapted to engage said shutter mechanism to prevent an operation thereof.

3. The combination with a photographic shutter and the casing thereof, of a cylindrical extension from said casing, a lever centrally pivoted in said casing and a second lever operated by said first mentioned lever and adapted to engage said shutter mechanism to prevent an operation thereof and a rotatable disk upon the pivot of said first mentioned lever and rotated by said first mentioned lever to indicate each consecutive operation of said first mentioned lever and a plurality of springs for returning both said levers to their normal positions.

4. A photographic shutter having an extension therefrom, a rockable lever pivoted in said extension and adapted to engage a portion of said shutter, a rotatable lever pivoted in said extension and adapted to rock said first mentioned lever, a disk upon the pivot of said second lever and a dog upon said second lever for advancing said disk the second dog for returning said disk each said dog being provided with an extension by means of which said dogs may be released.

5. A photographic shutter having an extention therefrom, a rockable lever pivoted in said extension and adapted to engage a portion of said shutter, a rotatable lever pivoted in said extension and adapted to rock said first mentioned lever, a disk upon the pivot of said second lever and a dog upon said second lever for advancing said disk, the second dog for returning said disk each said dog being provided with an extension by means of which said dogs may be released, in combination with means for returning said disk to its original position and a stop for limiting the return of said disk.

LINDEN PETER CARHART.